(12) United States Patent
Balc et al.

(10) Patent No.: US 9,199,358 B2
(45) Date of Patent: Dec. 1, 2015

(54) ACTUATING DEVICE

(75) Inventors: Nicolae Balc, Cluj-Napoca (RO); Vasile Danut Leordean, Cluj-Napoca (RO); Bernhard Schuh, Nürnberg (DE); Detlev Ulle, Ostheim (DE); Peter Walther, Bad Homburg (DE)

(73) Assignee: Delaware Capital Formation, Inc., Wilmington, DE (US)

( * ) Notice: Subject to any disclaimer, the term of this patent is extended or adjusted under 35 U.S.C. 154(b) by 363 days.

(21) Appl. No.: 13/236,776

(22) Filed: Sep. 20, 2011

(65) Prior Publication Data

US 2012/0073392 A1 Mar. 29, 2012

(30) Foreign Application Priority Data

Sep. 23, 2010 (DE) .................... 10 2010 046 188

(51) Int. Cl.
*F16H 19/04* (2006.01)
*F16H 19/08* (2006.01)
*B25B 5/06* (2006.01)

(52) U.S. Cl.
CPC ............... *B25B 5/061* (2013.01); *B25B 5/064* (2013.01); *F16H 19/04* (2013.01); *Y10T 74/18088* (2015.01)

(58) Field of Classification Search
CPC ......... B25B 5/061; B25B 5/064; F16H 19/04; F16H 55/17; F16H 55/26
USPC .................. 74/29, 32, 33, 842, 76, 79, 89.11, 74/89.12, 89.17, 89.18, 109, 422, 74/490.01–490.15; 81/258, 259, 129.5, 81/134; 279/4.1, 4.12, 117
See application file for complete search history.

(56) References Cited

U.S. PATENT DOCUMENTS

| | | | | |
|---|---|---|---|---|
| 5,819 A | * | 10/1848 | Marsh | 101/250 |
| 84,007 A | * | 11/1868 | Shanner | 74/32 |
| 202,577 A | * | 4/1878 | Palmer | 417/547 |
| 378,041 A | * | 2/1888 | Cresswell | 91/297 |
| 423,322 A | * | 3/1890 | James | 74/32 |
| 789,709 A | * | 5/1905 | Bilson | 74/29 |
| 904,314 A | * | 11/1908 | Davis | 74/33 |
| 939,063 A | * | 11/1909 | Myrholm | 74/32 |
| 1,022,825 A | * | 4/1912 | Cammack | 74/89.11 |
| 1,590,426 A | * | 6/1926 | Dayton et al. | 74/422 |
| 1,633,045 A | * | 6/1927 | Stebbins | 74/41 |

(Continued)

FOREIGN PATENT DOCUMENTS

| | | |
|---|---|---|
| DE | 1183204 | 12/1964 |
| DE | 2517259 | 12/1976 |

(Continued)

*Primary Examiner* — David M Fenstermacher
*Assistant Examiner* — Jake Cook
(74) *Attorney, Agent, or Firm* — Harness, Dickey & Pierce, P.L.C.

(57) ABSTRACT

An actuating device has a drive element with a cylinder (1) and a piston (2) having a piston rod (3). A toothed rack (4) is provided outside the cylinder (1) on the piston rod (3). The toothed rack (4) is implemented to cooperate with a gear element (5). An actuating element (6), pivotable in relation to the drive element, is situated in a rotationally-fixed manner with the gear element (5). An intermediate gear element (7) is situated between the cylinder (1) and the gear element (5). The intermediate gear element (7) cooperates, on one side, with the toothed rack (4) and, on the other side, with the gear element (5).

11 Claims, 4 Drawing Sheets

(56) References Cited

U.S. PATENT DOCUMENTS

| | | | | |
|---|---|---|---|---|
| 1,654,093 | A * | 12/1927 | Reid | 74/29 |
| 1,780,329 | A * | 11/1930 | Bard | 74/89.14 |
| 1,835,680 | A * | 12/1931 | Varcin | 74/32 |
| 1,903,555 | A * | 4/1933 | Robertson | 74/29 |
| 2,142,735 | A * | 1/1939 | Rougemont | 409/139 |
| 2,192,175 | A * | 3/1940 | Ballard | 60/572 |
| 2,286,661 | A * | 6/1942 | Warner | 92/1 |
| 2,350,372 | A * | 6/1944 | Seyferth et al. | 74/120 |
| 2,491,945 | A * | 12/1949 | Baker et al. | 200/81.4 |
| 2,502,057 | A * | 3/1950 | Mitchell | 74/41 |
| 2,534,920 | A * | 12/1950 | Ludwig et al. | 218/112 |
| 2,804,781 | A * | 9/1957 | Zietz | 74/396 |
| 2,830,461 | A * | 4/1958 | Sheppard | 74/388 PS |
| 2,885,902 | A * | 5/1959 | Hackett | 74/422 |
| 3,147,993 | A * | 9/1964 | Broderson et al. | 294/198 |
| 3,207,431 | A * | 9/1965 | Nirenberg | 235/101 |
| 3,328,853 | A * | 7/1967 | Pekrol | 164/262 |
| 3,350,780 | A * | 11/1967 | Artru et al. | 30/228 |
| 3,405,032 | A * | 10/1968 | Barrus et al. | 376/232 |
| 3,444,784 | A * | 5/1969 | Wengerd | 91/533 |
| 3,562,463 | A * | 2/1971 | Charbonneau et al. | 200/425 |
| 4,133,222 | A * | 1/1979 | Dooley | 74/502.3 |
| 4,258,580 | A * | 3/1981 | Lowe | 74/109 |
| 4,282,739 | A * | 8/1981 | Hallenbeck et al. | 72/449 |
| 4,767,955 | A * | 8/1988 | McDaniel | 310/20 |
| 4,773,812 | A * | 9/1988 | Bayne et al. | 414/408 |
| 4,872,359 | A * | 10/1989 | Schulz et al. | 74/109 |
| 4,872,360 | A | 10/1989 | Lew et al. | |
| 5,105,515 | A * | 4/1992 | Nelson | 29/281.3 |
| 5,233,389 | A * | 8/1993 | Deguchi et al. | 399/213 |
| 5,353,690 | A * | 10/1994 | Shin | 92/86 |
| 5,366,130 | A * | 11/1994 | Fukuda | 226/200 |
| 5,836,205 | A * | 11/1998 | Meyer | 74/89.17 |
| 6,250,169 | B1 * | 6/2001 | Weisser | 74/89.17 |
| 6,343,522 | B1 * | 2/2002 | Hori et al. | 74/422 |
| 7,013,759 | B1 * | 3/2006 | Childress, II | 81/57.34 |
| 8,261,453 | B2 * | 9/2012 | Huang | 30/92 |
| 2004/0012281 | A1 * | 1/2004 | Neubauer et al. | 310/75 R |
| 2006/0207368 | A1 * | 9/2006 | Hao et al. | 74/422 |
| 2006/0261619 | A1 * | 11/2006 | Maffeis | 294/88 |
| 2008/0257085 | A1 * | 10/2008 | Bless et al. | 74/421 R |
| 2008/0295894 | A1 * | 12/2008 | Uffner et al. | 137/355.27 |
| 2009/0056483 | A1 * | 3/2009 | Tsai | 74/29 |
| 2009/0224006 | A1 * | 9/2009 | Post et al. | 222/333 |
| 2010/0147978 | A1 * | 6/2010 | Vanagosoom | 239/587.2 |
| 2011/0072925 | A1 * | 3/2011 | Ikeda | 74/412 R |
| 2011/0138939 | A1 * | 6/2011 | Carr | 74/32 |
| 2013/0049554 | A1 * | 2/2013 | Todd | 312/9.1 |
| 2013/0167675 | A1 * | 7/2013 | Kim | 74/89.17 |
| 2013/0180414 | A1 * | 7/2013 | Chan et al. | 99/505 |
| 2014/0208894 | A1 * | 7/2014 | Miller | 74/665 G |

FOREIGN PATENT DOCUMENTS

| | | |
|---|---|---|
| DE | 3529921 | 10/1986 |
| DE | 3928496 | 3/1991 |
| DE | 20206951 | 9/2002 |
| DE | 10256385 | 2/2004 |
| DE | 102004042873 | 4/2006 |
| FR | 2268967 | 11/1975 |
| JP | 10-103441 | 4/1998 |
| WO | WO2007/042518 | 4/2007 |

* cited by examiner

ACTUATING DEVICE

CROSS-REFERENCE TO RELATED APPLICATION

This application claims priority to German Application No. DE102010046188.1, filed Sep. 23, 2010. The disclosure of the above application is incorporated herein by reference.

FIELD

The disclosure relates to an actuating device and, more particularly, to an actuating device with a drive element, toothed rack, gear element, actuating element and an intermediate gear element that is guided by the tooth rack inside the housing in spite of a long displacement distance to provide the corresponding pivoting range of the actuating element.

BACKGROUND

An actuating device is known according to DE 1 183 204 A. It includes a drive element, a toothed rack, a gear element, and an actuating element. The drive element includes a cylinder and a piston with a piston rod. The toothed rack is provided outside the cylinder on the piston rod. The toothed rack cooperates with a gear element. An actuating element, pivotable in relation to the drive element is situated in a rotationally-fixed manner with the gear element. In this solution, "cooperating" is to be understood to mean that the gear element and the toothed rack are directly connected to one another another, during movement of the piston or the piston rod. The actuating element is implemented as a pivot lever of a foundry molding machine in this solution.

SUMMARY

The disclosure is based on the object of improving an actuating device of the mentioned type. In particular, an actuating device of the mentioned type is to be improved in such a manner that during use of a gear-toothed rack combination, a housing form is usable which is typical in pivot units or clamping devices and is known, for example, from DE 102 56 385 B3.

This problem is solved with an actuating device comprising a drive element with a cylinder and a piston having a piston rod. A toothed rack is provided outside the cylinder on the piston rod. The toothed rack cooperates with a gear element. An actuating element, pivotable in relation to the drive element, is situated in a rotationally-fixed manner with the gear element. An intermediate gear element is situated between the cylinder and the gear element. The intermediate gear element cooperates, on one side, with the toothed rack and, on the other side, with the gear element.

It is thus provided according to the disclosure that an intermediate gear element, which cooperates on one side with the toothed rack and on the other side with the gear element, is situated between the cylinder and the gear element.

In other words, an auxiliary gear (intermediate gear element), which initially appears unnecessary or superfluous, is provided according to the disclosure. Due to this gear, however, it is possible to house the gear toothed rack combination known from DE 1 183 204 A in a housing typically used for clamping devices or pivot units. In particular, due to the arrangement of the auxiliary gear between the cylinder and the gear element, it has the result that the extension distance of the toothed rack in the head area of the clamping devices or the pivot units, on the end of the actuating device opposite to the cylinder, can be kept small. If one dispensed with the auxiliary gear, as in the previously known prior art, it is unavoidable that the toothed rack would protrude well beyond the gear element provided with the actuating element in the case of the corresponding piston position. Due to the additional expense of the intermediate gear element, usable space in the head of the actuating device is advantageously obtained in a surprising manner for the travel distance of the toothed rack.

With respect to the proviso that the intermediate gear element is to be situated "between" the cylinder and the gear element, it is to be noted that this means any arrangement where the above-described spatial advantage results. In particular, this accordingly does not mean an arrangement where the axes of the gear element and the intermediate gear element have the same spacing from the cylinder. It is to say that the gear element is not situated "above" the intermediate gear element which cooperates with the toothed rack.

Furthermore, according to the disclosure, more than "one" intermediate gear element can also be provided between the toothed rack and the gear element with the actuating element, in order to achieve the effect according to the disclosure.

If only "one" intermediate gear element is actually provided, with a drive element, a toothed rack, a gear element and an actuating element, the intermediate gear element "cooperates" on one side with the toothed rack and on the other side with the gear element. Thus, it is to be understood that the intermediate gear works together or meshes directly in each case in a formfitting manner with both the toothed rack and also with the gear element.

In contrast, for example, if two intermediate gear elements are provided, "cooperates" means that one intermediate gear element works together in a formfitting manner on one side with the toothed rack and on the other side with the other intermediate gear element. Accordingly, the other intermediate gear element additionally meshes in a formfitting manner with the gear element provided with the actuating element.

Further areas of applicability will become apparent from the description provided herein. The description and specific examples in this summary are intended for purposes of illustration only and are not intended to limit the scope of the present disclosure.

DRAWINGS

The actuating device according to the disclosure, including the advantageous refinements thereof, are described in greater detail hereafter on the basis of the illustration of various exemplary embodiments in the drawings.

DETAILED DESCRIPTION

Figure 1:
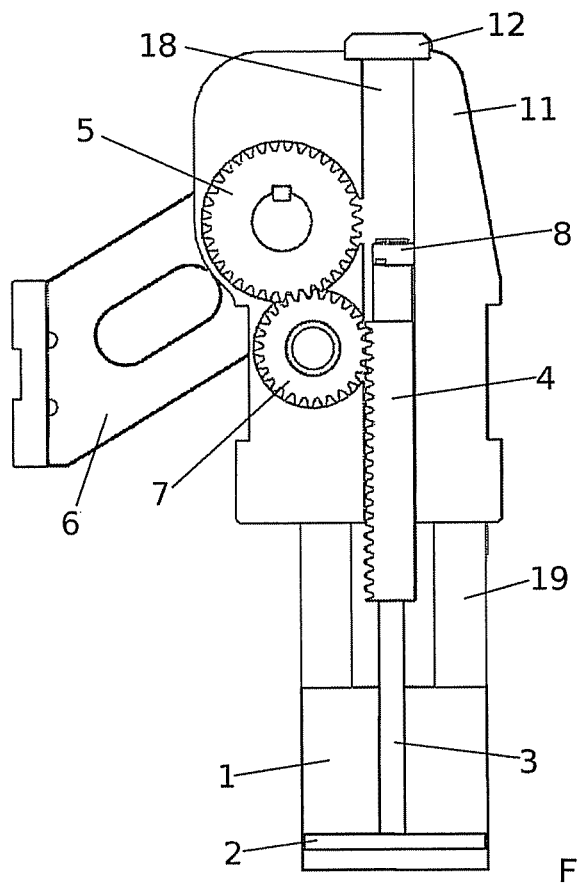
FIG. 1 is a schematic cross-section view of an embodiment of the actuating device in the working position.

The actuating device shown in FIGS. 1 to 7 includes a drive element that includes a cylinder 1 and a piston 2 with a piston rod 3. This drive element is implemented so that it can be actuated alternately hydraulically or pneumatically. A toothed rack 4 is provided outside the cylinder 1 on the piston rod 3. The tooth rack 4 cooperates with a gear element 5. An actuating element 6, pivotable in relation to the drive element, is situated in a rotationally-fixed manner on the gear element 5. The toothed rack 4 and the gear element 5 are situated in a housing 11. The housing 11 adjoins the drive element via an interposed spacer element 19. The spacer element 19 is formed in a known manner from two housing half-shells. The housing 11 has an approximately cuboid (narrow, oblong) external shape with rounded edges. The housing 11 is also known for toggle lever clamping devices or pivot devices, in order to allow easy replaceability with respect to these typical devices. In addition, attachment areas for fastening the actuating device on an automatic production plant or the like are provided on multiple sides on the housing.

It is essential for the actuating device, according to the disclosure, that an intermediate gear element 7 is situated between the cylinder 1 and the gear element 5. The intermediate gear element 7 cooperates, on one side, with the toothed rack 4 and, on the other side, with the gear element 5.

This measure has the advantage that the toothed rack 4 can be guided inside the housing 11 in spite of a long displacement distance. The long displacement distance is required for a corresponding pivot range of the actuating element 6.

Figure 2:
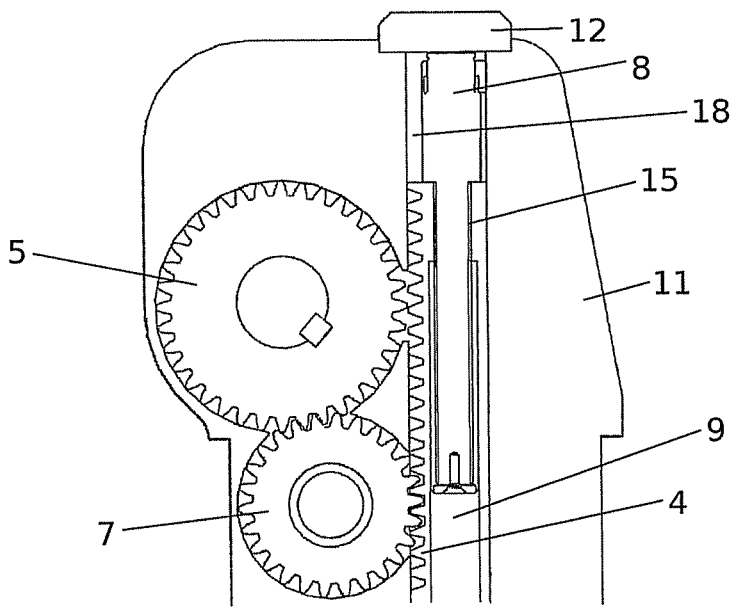
FIG. 2 is an enlarged section view of a portion of the embodiment of FIG. 1 in the open position.
Figure 3:
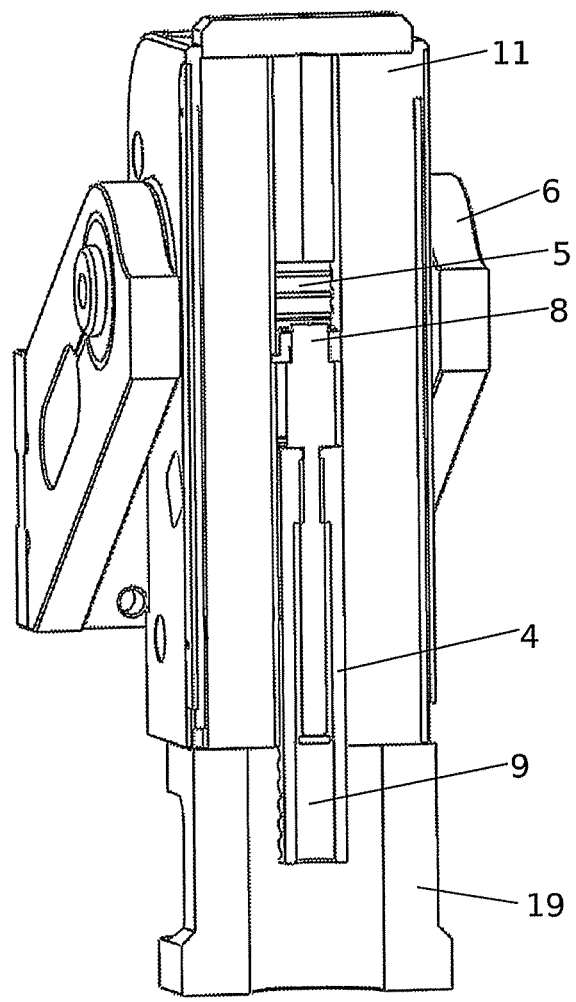
FIG. 3 is a perspective, partially in section, view of the actuating device according to FIG. 1 in the working position.

In the exemplary embodiment according to FIGS. 1 to 3, the actuating device, according to the disclosure, is implemented as a so-called pivot device. For example, a heavy component, a processing device, or the like is fastened on the actuating element 6 of such a pivot device.

In this exemplary embodiment, both the gear element 5 and also the intermediate gear element 7 are situated on one side of the toothed rack 4. The gear element 5 is situated as far as possible above the intermediate gear element 7. As illustrated in FIGS. 1 and 2, the gear element 5 is positioned with a spacing to the toothed rack 4 such that the respective teeth just do not touch. With respect to a favorable torque, it is further provided that the gear element 5 has a greater diameter than the intermediate gear element 7.

An important property of such pivot devices is that the opening angle of the actuating element 6 (therefore the upper end location of the toothed rack 4 shown in FIG. 2) can be set precisely, since this is always to be selected as small as possible, but as large as necessary, oriented to the application.

For this purpose, an opening angle limiting element 8 is associated with the toothed rack 4 on its free end facing away from the piston 2. This element is particularly situated so it is longitudinally adjustable on the toothed rack 4. A threaded connection 15 is provided between the opening angle limiting element 8 and the toothed rack 4 to enable adjustability. In addition, the toothed rack 4 has a cavity 9 for at least partially receiving the opening angle limiting element 8. The threaded connection 15 is situated in or on the cavity 9. The toothed rack 4 is provided with an internal thread and the opening angle limiting element 8 is provided with a matching external thread.

As a counterpart to the opening angle limiting element 8, a buttress 12 is situated in a fixed but removable manner on the housing 11. Furthermore, the housing 11 has a cavity 18 in extension of the toothed rack 4 to receive the opening angle limiting element 8. The cavity is implemented so it can be provided or terminated with the buttress 12. In addition, the buttress 12 acts as a stop element, in particular a stop plate, accessible from outside the housing 11.

Viewing FIGS. 1 to 3, the functioning of the mentioned opening angle limiting element 8 is described. A setting that allows a maximum opening angle is shown. If the opening angle limiting element 8, after the buttress 12 is removed from the housing 11, is rotated out of the cavity 9, via the threaded connection 15, the spacing of its free end to the toothed rack 4 increases. Thus, the adjustment distance of the toothed rack 4 as well as the opening angle is restricted simultaneously.

In the exemplary embodiment according to FIGS. 4 to 7, the actuating device is implemented as a clamping device. The actuating element 6 of such a clamping device is a clamping arm. The clamping arm can be connected to the rotational axis (a square shaft here) of the gear element 5 on either one side or also on both sides of the device.

An essential feature of this embodiment is that the intermediate gear element 7 is implemented as a gearwheel roller situated on one side of the toothed rack 4. The gear element 5 is situated, on the other side, encompassing or overlapping the toothed rack 4. Viewing FIG. 4, it can be seen that the gear element 5 is implemented as a double gearwheel that encompasses the toothed rack 4 on both sides. The toothed rack 4 can move up and down between the gearwheels of the double gearwheel (gear element 5). The intermediate gear element 7 has a width that corresponds to at least the spacing of the gearwheels of the double gearwheel. Thus, the intermediate gear element 7 has a meshing connection centrally with the toothed rack 4 and on its edges with the gearwheels of the double gearwheel of gear element 5.

In order to be able to make the actuating device as compact as possible, but also because the opening angle of the clamping arm is typically significantly less than 180°, in the embodiment shown, both the gear element 5 and also the intermediate gear element 7 are in the form of circular sectors. Depending on the housing shape, however, it is also possible that, alternately, the gear element 5 or the intermediate gear element 7 is in the form of a circular sector. The comparison of FIGS. 5 and 6 shows that gears in the form of circular sectors are sufficient to be able to set both the open position (see FIG. 5) and also the working position (see FIG. 6).

A stop element 10 is also provided in this embodiment to limit the opening angle. The stop element 10 is alternately situated on the piston rod 3 or the toothed rack 4.

Figure 4:
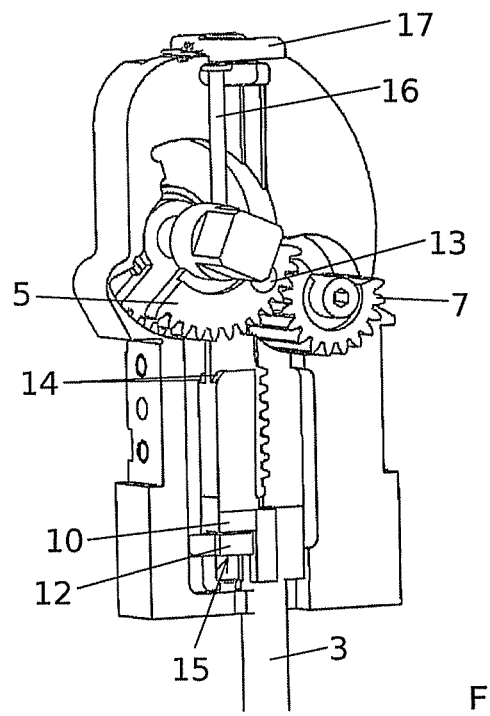
FIG. 4 is a perspective, partially in section, view of another embodiment of the actuating device in a first opening angle setting with an installed twist lock.
Figure 5:
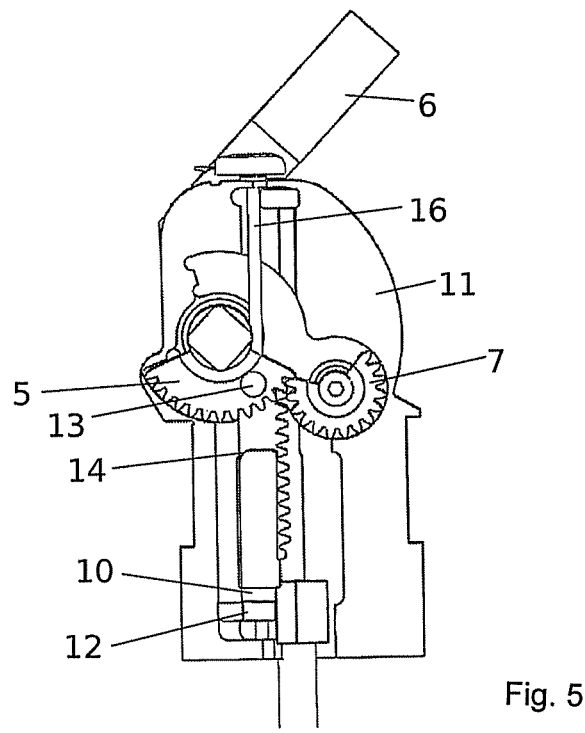
FIG. 5 is a sectional view according to FIG. 4 in another opening angle setting.
Figure 6:
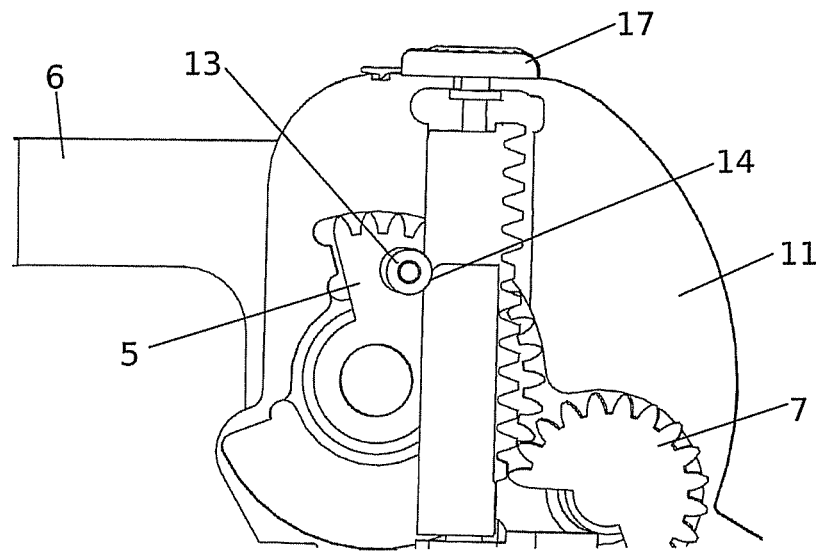
FIG. 6 is an enlarged section view of FIG. 4 in the working position.
Figure 7:
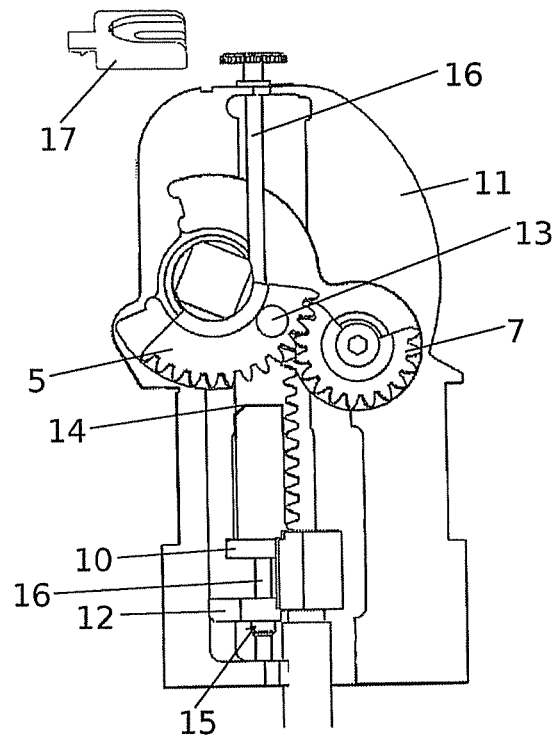
FIG. 7 is a section view of the embodiment according to FIG. 4 in a further opening angle setting with an uninstalled twist lock.

Since an inverted rotational movement results in comparison to the first exemplary embodiment due to the arrangement of the gears on both sides of the toothed rack 4, the stop element 10, in the exemplary embodiment according to FIGS. 4 to 7, is situated between the intermediate gear element 7 and the cylinder 1. An adjustable buttress 12 is additionally associated with the stop element 10 in the housing 11 (on the drive element side). The buttress 12, in turn, is connected to an externally actuable final control element 16. This final control element 16 is implemented as a rod with a thread. The rod runs through a cavity 9 in the toothed rack 4. The part of the final control element 16 is accessible from outside the housing 11. The part is situated on the end of the housing 11 facing away from the cylinder. The final control element 16 is additionally provided outside of the housing 11 with a twist lock 17. FIGS. 4 to 6 show the actuating device with the installed twist lock 17. FIG. 7 discloses a partial perspective view of the approximately horseshoe-shaped form of the twist lock 17. Teeth are on a rotary knob of the final control element 16. These teeth are implemented to cooperate with corresponding teeth on the twist lock 17 causing the desired locking.

Thus, if one wishes to influence the opening angle of the actuating device, one first disengages the twist lock 17. Next, the final control element 16 is rotated. Thus, the buttress 12 for the stop element 10, which is fastened on the toothed rack 4 or on the piston rod 3, is alternately displaced upward or downward via the threaded connection (only indicated here) in the direction of the main axis of the toothed rack 4.

A further feature of the embodiment according to FIGS. 4 to 7 is that an operational link between the toothed rack 4 and the gear element 5, which exists via the intermediate gear element 7, can be decoupled. This may be best illustrated in FIG. 6. The toothed rack 4 has a "tooth-free" area on the piston rod side. At least the tooth of the toothed rack 4 closest to the piston rod is at least implemented as shortened or even left out entirely. Thus, the operational link between toothed rack 4 and the intermediate gear element 7 is canceled out. Instead, for this special actuating position, in order to nonetheless ensure a force flow between the toothed rack 4 and the gear element 5, a final control element 13 and guide element 14 are provided. The final control element 13 is spaced apart from the rotational axis on the gear element 5. The guide element 14, which cooperates with the final control element 13 (in the decoupled position), is provided on the toothed rack 4. The guide element 14 is a control curve to fix the actuating element 6 in the clamped position (working position). The final control element 13, shown as a cylindrical pin, is mounted so that it is rotatable on the gear element 5. If a double gear is implemented, as explained above, two final control elements 13 and two guide elements 14 can also be provided, accordingly.

Therefore, if the toothed rack 4 travels into an upper position, where the engagement between toothed rack 4 and intermediate gear element 7 does not exist, due to the lack of teeth at this point, contact is established between the guide element 14, provided on the toothed rack 4, and the final control element 13, situated on the gear element 5. Accordingly, the guide element 14 prevents a rotational movement in the direction of the open position (see FIG. 6). Since the guide element 14 is implemented as a control curve (inclined plane) as mentioned above, a self-limiting operational link advantageously results. This provides a substantially greater opening resistance than the thus easily rotating connection via the toothed connection (toothed rack 4, gear element 5, intermediate gearwheel element 7). In other words, the solution according to the disclosure is distinguished in that in spite of the use of a gear connection, an actual locking position is achievable in the working position.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An actuating device comprising: a housing; a drive element with a cylinder and a piston having a piston rod; a toothed rack is provided outside the cylinder on the piston rod; a gear element cooperates with the toothed rack, the gear element is driven by the drive element via the toothed rack and an intermediate gear element, the piston rod and gear element are positioned inside the housing; an actuating element cooperates with the gear element for adjusting the pivot range of the actuating element, the actuating element is pivotable in relation to the drive element, the actuating element is situated in a rotationally-locked manner on the gear element and the actuating element is positioned entirely outside the housing; and the intermediate gear element is situated inside the housing, as an idler gear, the intermediate gear is positioned between the cylinder and the gear element, the intermediate gear element meshes with the toothed rack and with the gear element passively transmitting rotation to the gear element from the toothed rack for pivoting the actuating element coupled with the gear element.

2. The actuating device according to claim 1, wherein both the gear element and the intermediate gear element are situated on one side of the toothed rack.

3. The actuating device according to claim 1, wherein an opening angle limiting element is associated with the toothed rack on its free end facing away from the piston.

4. The actuating device according to claim 3, wherein the toothed rack has a cavity for receiving the opening angle limiting element.

5. The actuating device according to claim 1, wherein the intermediate gear element is implemented as a gearwheel in front of a tooth side of the toothed rack and the gear element is situated encompassing the toothed rack behind the tooth side of the toothed rack.

6. The actuating device according to claim 5, wherein the gear element is implemented as a double gear that encompasses the toothed rack so that the toothed rack is between the double gear.

7. The actuating device according to claim 5, wherein a stop element is situated alternately on the piston rod or the toothed rack.

8. The actuating device according to claim 7, wherein the toothed rack is situated in a housing and an adjustable buttress is associated with the stop element in the housing.

9. The actuating device according to claim 1, further comprising an operational link between the toothed rack and the gear element, existing via the intermediate gear element, is implemented so it can be decoupled.

10. The actuating device according to claim 9, said operational link further comprising a final control element provided on the gear element spaced apart from the rotational axis, and a guide element provided on the toothed rack, the guide element cooperates with the final control element in the decoupled position.

11. An actuating device comprising: a housing; a drive element with a cylinder and a piston having a piston rod; a toothed rack is provided outside the cylinder on the piston rod; a gear element cooperates with the toothed rack, the gear element is driven by the drive element via the toothed rack and an intermediate gear element, the piston rod and gear element are positioned inside the housing; an actuating element cooperates with the gear element for adjusting the pivot range of the actuating element, the actuating element is pivotable in relation to the drive element, the actuating element is situated in a rotationally-locked manner on the gear element and the actuating element is positioned entirely outside the housing; and the intermediate gear element is situated inside the housing, as an idler gear, the intermediate gear is positioned between the cylinder and the gear element, the intermediate gear element meshes with the toothed rack and with the gear element passively transmitting rotation to the gear element from the toothed rack for pivoting the actuating element coupled with the gear element and the intermediate gear element has a radius smaller than the gear element for favorable torque transmission.

\* \* \* \* \*

UNITED STATES PATENT AND TRADEMARK OFFICE
CERTIFICATE OF CORRECTION

PATENT NO. : 9,199,358 B2
APPLICATION NO. : 13/236776
DATED : December 1, 2015
INVENTOR(S) : Nicolae Balc et al.

Page 1 of 1

It is certified that error appears in the above-identified patent and that said Letters Patent is hereby corrected as shown below:

In the specification

Column 1
Line 30    after "another", insert --in a formfitting manner. The gear element and the toothed rack mesh with, or in one--

Signed and Sealed this
Nineteenth Day of April, 2016

Michelle K. Lee
*Director of the United States Patent and Trademark Office*